US007049564B2

(12) United States Patent
Takada et al.

(10) Patent No.: US 7,049,564 B2
(45) Date of Patent: May 23, 2006

(54) INDUCTION HEATING DEVICE

(75) Inventors: Kiyoyoshi Takada, Kobe (JP); Naoaki Ishimaru, Minoo (JP); Tamotsu Izutani, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/524,372

(22) PCT Filed: Jul. 1, 2004

(86) PCT No.: PCT/JP2004/009702

§ 371 (c)(1),
(2), (4) Date: Feb. 15, 2005

(87) PCT Pub. No.: WO2005/004541

PCT Pub. Date: Jan. 13, 2005

(65) Prior Publication Data

US 2005/0242088 A1 Nov. 3, 2005

(30) Foreign Application Priority Data

Jul. 4, 2003 (JP) ............................ 2003-192369

(51) Int. Cl.
*H05B 6/06* (2006.01)
*H05B 6/12* (2006.01)
*A47J 27/00* (2006.01)

(52) U.S. Cl. ...................... 219/627; 219/667; 219/668; 219/711; 374/121; 374/149

(58) Field of Classification Search ........ 219/620–627, 219/663–668, 711, 494; 374/121, 149; 99/DIG. 14, 99/325, 451
See application file for complete search history.

(56) References Cited

U.S. PATENT DOCUMENTS 3,742,175 A * 6/1973 Harnden, Jr. ............... 219/627
4,351,996 A * 9/1982 Kondo et al. ............... 219/625

FOREIGN PATENT DOCUMENTS

JP 2-106134 A 8/1990

(Continued)

*Primary Examiner*—Philip H. Leung
(74) *Attorney, Agent, or Firm*—Akin Gump Strauss Hauer & Feld, LLP

(57) ABSTRACT

The present invention offers an induction heating apparatus in which the infrared sensor performs stable temperature detection without undergoing the influence of leakage magnetic flux from the induction heating means. This induction heating apparatus has a main frame which forms an outer casing, a top plate provided on the upper side plane of the above-mentioned main frame and having at least one loading part on which a cooking container to be heated is placed, an induction heating means which is provided under the above-mentioned loading part and is to heat the above-mentioned cooking container to be heated, an infrared sensor which is provided in the neighborhood of the above-mentioned induction heating means and receives the infrared radiation radiated from the above-mentioned cooking container to be heated, and outputs the detected signal corresponding to the amount of the infrared radiation, a control board that detects the temperature of the above-mentioned cooking container to be heated based on the above-mentioned detected signal, and controls the output of the above-mentioned induction heating means, and a magneto-shielding member having a cylindrical body covering the periphery of the above-mentioned infrared sensor and a side part covering at least a part of the above-mentioned control board and being composed thereof in a single unitary body.

18 Claims, 3 Drawing Sheets

FOREIGN PATENT DOCUMENTS

| | | | |
|---|---|---|---|
| JP | 03184295 | A | 8/1991 |
| JP | 7-246156 | A | 9/1995 |
| JP | 2002-75624 | A | 3/2002 |
| JP | 2002-300959 | A | 10/2002 |

* cited by examiner

INDUCTION HEATING DEVICE

CROSS-REFERENCE TO RELATED APPLICATION

This application is a Section 371 of International Application No. PCT/JP2004/009702. filed Jul. 1, 2004, which was published in the Japanese language on Jan. 13, 2005, under International Publication No. WO 2005/004541 A1, the disclosure of which is incorporated herein by reference.

1. Technical Field

The present invention relates to induction heating apparatus equipped with an infrared sensor.

2. Background Art

In recent years, as for the cooking apparatus without using fire, market of induction heating apparatus has been growing. Referring to FIG. 5 and FIG. 6, induction heating apparatuses of prior art examples are elucidated. The induction heating apparatus of a prior art 1 is described using FIG. 5. FIG. 5 is a cross-sectional drawing showing a configuration of an induction heating apparatus of the prior art 1 using a thermo-sensitive element. The induction heating apparatus of prior art 1 comprises a main frame 1 that forms an external casing, a top plate 2 made of non-magnetic material and on which a cooking container 53 is to be placed, an induction heating coil 4 which is arranged under the top plate 2 for induction-heating a cooking container 53, a thermo-sensitive element 54 that is made contacted with pressure to the back side of the top plate 2 and outputs detected signal responding to the temperature thereof, a temperature calculation means 51, and a control means 52. In the induction heating apparatus of the prior art 1, temperature of the bottom plane of a cooking container 53 placed on the top plate 2 is detected using a thermo-sensitive element. The temperature calculation means 51 calculates the temperature of the cooking container 53 based on the output signal of the thermo-sensitive element 54. The control means 52 controls the electric power supplied to the induction heating coil 4 based on the temperature information obtained from the temperature calculation means 51.

The control means 52 supplies a high frequency current to the induction heating coil 4. The induction heating coil 4 generates a high frequency magnetic field. This high frequency magnetic field crosses with the cooking container 53 and the cooking container 53 itself is induction-heated and generates heat. Material to be cooked contained in the cooking container 53 is heated by the heat generated in the cooking container 53 and the cooking process proceeds. Based on the temperature signal that is detected by the temperature calculation means 51, the control means 52 adjusts the electric power to be supplied to the induction heating coil 4; by this electric power adjustment, the temperature of the material to be cooked is controlled.

The thermo-sensitive element 54 detects the temperature of cooking container 53 through the top plate 2. The top plate 2 is composed of ceramic and hence the thermal conductivity is small. Therefore, delay occurred in the temperature detection of the cooking container 53 by the thermo-sensitive element 54, and there has been a problem that the conventional induction heating apparatus is inferior in the heat response characteristic.

The induction heating apparatus of a prior art 2 is described using FIG. 6. FIG. 6 is a cross-sectional drawing showing the composition of an induction heating apparatus of a prior art 2 in which an infrared sensor is used. In FIG. 6, the point that is different from that in FIG. 5 is that it has an infrared sensor 5 in place of the thermo-sensitive element 54. Since the other components are identical with figure FIG. 5, identical numerals are used and explanations thereof are omitted.

An infrared sensor 5 is arranged under the top plate 2 and detects the infrared radiation radiated from the bottom plane of the cooking container 53 across the top plate 2; the infrared sensor 5 outputs a signal according to the temperature which is detected in this manner. Temperature calculation means 51 calculates the temperature of cooking container 53 based on the output signal of the infrared sensor 5. The control means 52 controls a power supplied to the induction heating coil 4 based on the information obtained from the temperature calculation means 51.

The infrared radiation radiated from the cooking container 53 passes through the top plate 2 and reaches the infrared sensor 5. In the temperature detection system using the infrared sensor 5, the problem that the inferiority in the heat response was conquered (Reference to, for example, Japanese Unexamined Patent Publication No. Hei 03-184295).

However, when the infrared sensor 5 is arranged in the neighborhood of the induction heating coil 4 as in the composition of the induction heating apparatus of the prior art 2, the following problem occurs: That is, the infrared sensor undergoes influences of the induction magnetic field from the induction-heating coil 4, which was occurring during the cooking by the induction heating, thereby the infrared sensor 5 itself generates the heat. As a result, in the conventional induction heating apparatus, it was not possible to attain an accurate temperature detection, and hence the stable heating control could not be realized.

The present invention intends to dissolve the above-mentioned hitherto existing problem: In the present invention, it purposes to provide the induction heating apparatus in which an infrared sensor performs a stable temperature detection without undergoing influences by the leak magnetic flux from the induction heating means.

DISCLOSURE OF INVENTION

In order to dissolve the above-mentioned problem, the induction heating apparatus according to the present invention has;

a main frame that forms an outer casing, a top plate provided on the upper side plane of the above-mentioned main frame and having at least one loading part on which a cooking container to be heated is placed, an induction heating means that is provided under the above-mentioned loading part and is to heat the above-mentioned cooking container to be heated, an infrared sensor which is provided in the neighborhood of the above-mentioned induction-heating means and receives the infrared radiation radiated from the above-mentioned cooking container to be heated, and outputs the detected signal corresponding to the amount of radiation thereof, a control board that detects the temperature of the above-mentioned cooking container to be heated based on the above-mentioned detected signal, and controls the output of the above-mentioned induction heating means, a magneto-shielding member configured in a single unit including a cylindrical part which covers the periphery of the above-mentioned infrared sensor and a side part which covers at least a part of the above-mentioned control board.

The present invention has the technical effect that it can realize the induction heating apparatus in which an infrared sensor detects stably the temperature in high accuracy without undergoing influences by the leakage magnetic flux from the induction heating means.

While the novel features of the invention are set forth particularly in the appended claims, the invention, both as to organization and content, will be better understood and appreciated, along with other objects and features thereof, from the following detailed description taken in conjunction with the drawings.

Figure 1:
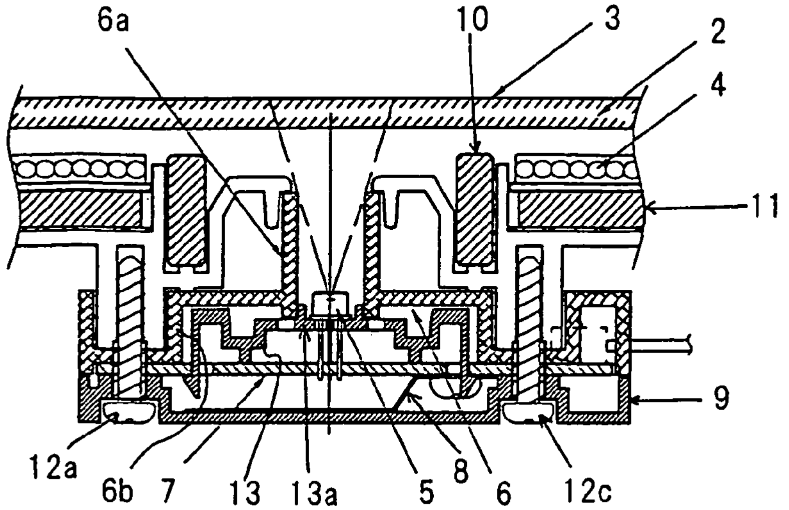
FIG. 1 is a cross-sectional drawing of principal part showing the configuration of the induction heating apparatus in an embodiment 1 of the present invention.

It will be recognized that some or all of the Figures are schematic representations for purposes of illustration and do not necessarily depict the actual relative sizes or locations of the elements shown.

BEST MODE FOR CARRYING OUT THE INVENTION

An induction heating apparatus according to one aspect of the present invention has;

a main frame that forms an outer casing, a top plate provided on the upper side plane of the above-mentioned main frame and having at least one loading part on which a cooking container to be heated is placed, an induction heating means, which is provided under the above-mentioned loading part and is to heat the above-mentioned cooking container to be heated, an infrared sensor which is provided in the neighborhood of the above-mentioned induction heating means and receives the infrared radiation radiated from the above-mentioned cooking container to be heated, and outputs the detected signal corresponding to the amount of radiation thereof, a control board that detects the temperature of the above-mentioned cooking container to be heated based on the above-mentioned detected signal, and controls the output of the above-mentioned induction heating means, a magnetic shielding member configured in a single unit including a cylindrical body which covers the periphery of the above-mentioned infrared sensor and a side part which covers at least a part of the above-mentioned control board.

According to the present invention, the infrared sensor becomes less apt to undergo influences by the induction magnetic field from the induction heating means, which occurs during the heating cooking. According to the present invention, it becomes possible to realize an induction heating apparatus in which the heat generation of the infrared sensor itself due to the influence of the magnetic field of the induction-heating coil is suppressed.

According to the present invention, stabilization of the ambient temperature in the vicinity of the infrared sensor can be improved with a non-magnetic cylindrical body. Therefore, correct temperature detection becomes possible, and an induction heating apparatus capable of performing a stable heating control can be realized.

In the present invention, at least a part of the control board is covered with the side part of the magneto-shielding member; therefore, an induction heating apparatus, in which the stable temperature detection by an infrared sensor can be performed without any influence of leakage magnetic flux onto the control board from the induction heating coil, can be realized.

In the present invention, by making the cylindrical body and the side part of magneto-shielding material to be a single unitary body, a good assembling workability is realized. Thereby the accuracy of mounting positions of the infrared sensor and the magneto-shielding member can be improved. According to the present invention, an induction heating apparatus having a high dimensional accuracy, including a fewer number of parts, and also having an excellent assembling workability can be realized.

In the above-mentioned induction heating apparatus according to another aspect of the present invention, the above-mentioned cylindrical body is made to be a nearly coaxial shape and is formed to be a double cylindrical body.

According to the present invention, the magneto-shielding effect preventing the leakage of magnetic flux onto the infrared sensor can be raised further, and at the same time, because of the increase of the thermal capacity of the magneto-shielding member, ambient temperature around the infrared sensor can be maintained more stably. According to the present invention, an induction heating apparatus in which highly accurate temperature detection is attainable can be realized.

The above-mentioned induction heating apparatus according to another aspect of the present invention has openings at the joint part of the above-mentioned cylindrical body placed inside and the above-mentioned cylindrical body placed outside.

In the present invention, even when the outside cylindrical body is heated, by cutting the heat at the openings, the thermal conduction to the inside cylindrical body is reduced, thereby a substantial rise of the ambient temperature around the infrared sensor is prevented. According to the present invention, an induction heating apparatus in which the stable temperature detection is performed can be realized.

In the above-mentioned induction heating apparatus according to still another aspect of the present invention, material of the above-mentioned magneto-shielding member is aluminum. As for aluminum, the reflectivity for the infrared radiation is high (it transfers the infrared radiation radiated from the cooking container to be heated to the infrared sensor with low loss), while infrared radiation from aluminum itself is little (SIN ratio (signal-to-noise ratio) of the infrared radiation radiated from the cooking container to be heated is less apt to be degraded.). According to the present invention, an induction heating apparatus in which the temperature detection is performed in high accuracy can be realized.

In the above-mentioned induction heating apparatus according to still another aspect of the present invention, the above-mentioned magneto-shielding member is made of die-cast, and the inside of the above-mentioned cylindrical body is formed by the mirror-surface finishing. According to the present invention, an induction heating apparatus in which the infrared radiation is detected correctly can be realized.

Owing to the above, a magneto-shielding member having a complicated shape can be formed in a precise accuracy. To get a sufficient magneto-shielding effect, it is desirable that the magneto-shielding member is to be thick enough to a certain degree. The magneto-shielding member can be formed at the optimum thickness with the die-cast. The inner surface of the cylindrical body of die-cast can be formed by the mirror-surface finishing. With this, the infrared radiation radiated from the cooking container to be heated can be transferred to the infrared sensor in low loss.

When the cylindrical body is double, it is sufficient to mirror-surface finish the inner surface of the inner side cylindrical body.

In the above-mentioned induction heating apparatus according to still another aspect of the present invention, the inner surface of the above-mentioned cylindrical body is formed by the mirror-surface finishing with the roller burnishing.

The inside surface of the cylindrical body of the induction heating apparatus of the present invention has a high reflectivity. With this, the infrared radiation radiated from the cooking container to be heated can be transferred to the infrared sensor with low loss. According to the present invention, an induction heating apparatus in which the infrared radiation is detected correctly can be realized.

In the above-mentioned induction heating apparatus according to still another aspect of the present invention, the distance between the upper surface of the above-mentioned top plate and the upper surface of the above-mentioned infrared sensor is in a range of 15 millimeters to 35 millimeters.

When the distance from the top plate of the infrared sensor is too close, the infrared sensor undergoes the influence by the leakage magnetic flux from the induction heating means and becomes too hot. When the distance from the top plate is too far, input from the radiation of the cooking container to be heated becomes small. Consequently, the distance between the upper surface of the top plate and the upper surface of the infrared sensor is set to be in a range of 15 millimeters to 35 millimeters. In this range, the infrared sensor is less apt to undergo the influence by the leakage magnetic flux from the induction heating means and moreover it can accept an enough amount of infrared radiation. Desirably, the distance between the upper surface of the top plate and the upper surface of the infrared sensor is set to be 26 millimeters.

In the above-mentioned induction heating apparatus according to still another aspect of the present invention, thickness of the above-mentioned magneto-shielding member is in a range of 1.5 millimeters to 5 millimeters.

When the thickness of the magneto-shielding is too thin, the magnetic shielding effect thereof becomes too weak, whereas when the thickness of the magneto-shielding member becomes too thick, casting defects are produced inside the assembly after the casting and the magnetic shielding effect diminishes. Therefore, the magneto-shielding member is formed uniformly in a range of thickness of 1.5 millimeters to 5 millimeters. Desirably, a standard thickness of the magneto-shielding member is set to be 2 millimeters.

The above-mentioned induction heating apparatus according to still another aspect of the present invention further has a shield plate which covers almost all of the lower part of the above-mentioned control board.

Thereby, magnetic flux turning around from the underside of the control board is shielded out and the influence thereof can be prevented. According to the present invention, an induction heating apparatus that is less apt to undergo the influence of the leakage magnetic flux can be realized.

In the above-mentioned induction heating apparatus according to still another aspect of the present invention, the above-mentioned magneto-shielding member is grounded. According to the present invention, an induction heating apparatus that is still lesser apt to undergo the influence of the leakage magnetic flux can be realized.

In the above-mentioned induction heating apparatus according to still another aspect of the present invention, the above-mentioned magneto-shielding member and the above-mentioned shield plate are grounded. According to the present invention, an induction heating apparatus that is still lesser apt to undergo the influence of the leakage magnetic flux can be realized.

The above-mentioned induction heating apparatus according to still another aspect of the present invention further has a first resin cover which holds the above-mentioned magneto-shielding member, the above-mentioned first resin cover and the above-mentioned magneto-shielding member compose a nearly closed space in which the above-mentioned infrared sensor and the above-mentioned control board are stored.

The above-mentioned induction heating apparatus according to still another aspect of the present invention further has a first resin cover which holds the above-mentioned magneto-shielding member and the above-mentioned shield plate, the above-mentioned first resin cover, the above-mentioned magneto-shielding member and the above-mentioned shield plate compose a nearly closed space in which the above-mentioned infrared sensor and the above-mentioned control board are stored.

The induction heating apparatus typically has a fan in the lower part of the main frame, and the fan is suppressing the heating of the induction heating means by means of sending cooling wind to the induction heating means. However, when this wind passes through the neighborhood of the infrared sensor, the ambient temperature around the infrared sensor becomes unstable, and therefore the accuracy of temperature detection of the cooking container to be heated by the infrared sensor is degraded. In the present invention, the resin cover and the magneto-shielding member compose a nearly closed space, and an infrared sensor and a control board are stored in it; with this configuration, the structure is such that no cooling wind blows through the above-mentioned nearly closed space. The present invention thus can realize an induction heating apparatus in which the ambient temperature around the infrared sensor and the control board is kept constant, thereby the temperature of the cooking container to be heated is detected in high accuracy.

In The above-mentioned induction heating apparatus according to still another aspect of the present invention further has a second resin cover which is placed between said infrared sensor and the circuit board on which the infrared sensor is installed, and which shields almost whole part of the circuit board from the infrared radiation radiated from said cooking container to be heated. Thereby it is possible to prevent the time-lapsing degradation of the circuit board due to the infrared radiation radiated from the cooking container to be heated.

In the above-mentioned induction heating apparatus according to still another aspect of the present invention, the above-mentioned second resin cover holds the above-mentioned infrared sensor in position of a specified height from the above-mentioned circuit board. Owing to that the second resin cover holds stably the infrared sensor in the position of the specified height from the circuit board, the infrared sensor can be arranged at a certain upper position from the base plane of the cylindrical body of the magnetic material part. Thereby the infrared radiation radiated from the cooking container to be heated can be transferred to the infrared sensor with further lower loss.

The above-mentioned induction heating apparatus according to still another aspect of the present invention further has a second resin cover having a holding plane on which said infrared sensor is placed, and said magneto-shielding member has a recessed portion which is opened toward the lower direction, said holding plane is positioned in said recessed portion, and the side planes and the base plane of a space defined by said second resin cover and said recessed portion is nearly closed.

According to the present invention, flow of wind of the cooling fan or air flowing around the infrared sensor can be prevented further. According to the present invention, by making the ambient temperature of the infrared sensor more constant, an induction heating apparatus in which the temperature of the cooking container to be heated is detected in high accuracy can be realized.

In the above-mentioned induction heating apparatus according to still another aspect of the present invention, the above-mentioned infrared sensor is arranged in the central part of the above-mentioned induction heating means provided in a spiral shape and ferrites are provided between the above-mentioned induction heating means and the above-mentioned infrared sensor.

By providing the ferrites, it becomes possible to prevent an adverse effect on the infrared sensor given by the magnetic flux issued from the induction heating means. According to the present invention, an induction heating apparatus in which the temperature of the cooking container to be heated is detected in high accuracy can be realized.

Hereinafter, examples of embodiment showing the best mode for implementing the present invention are specifically described with the drawing.

Embodiment 1

Figure 4:
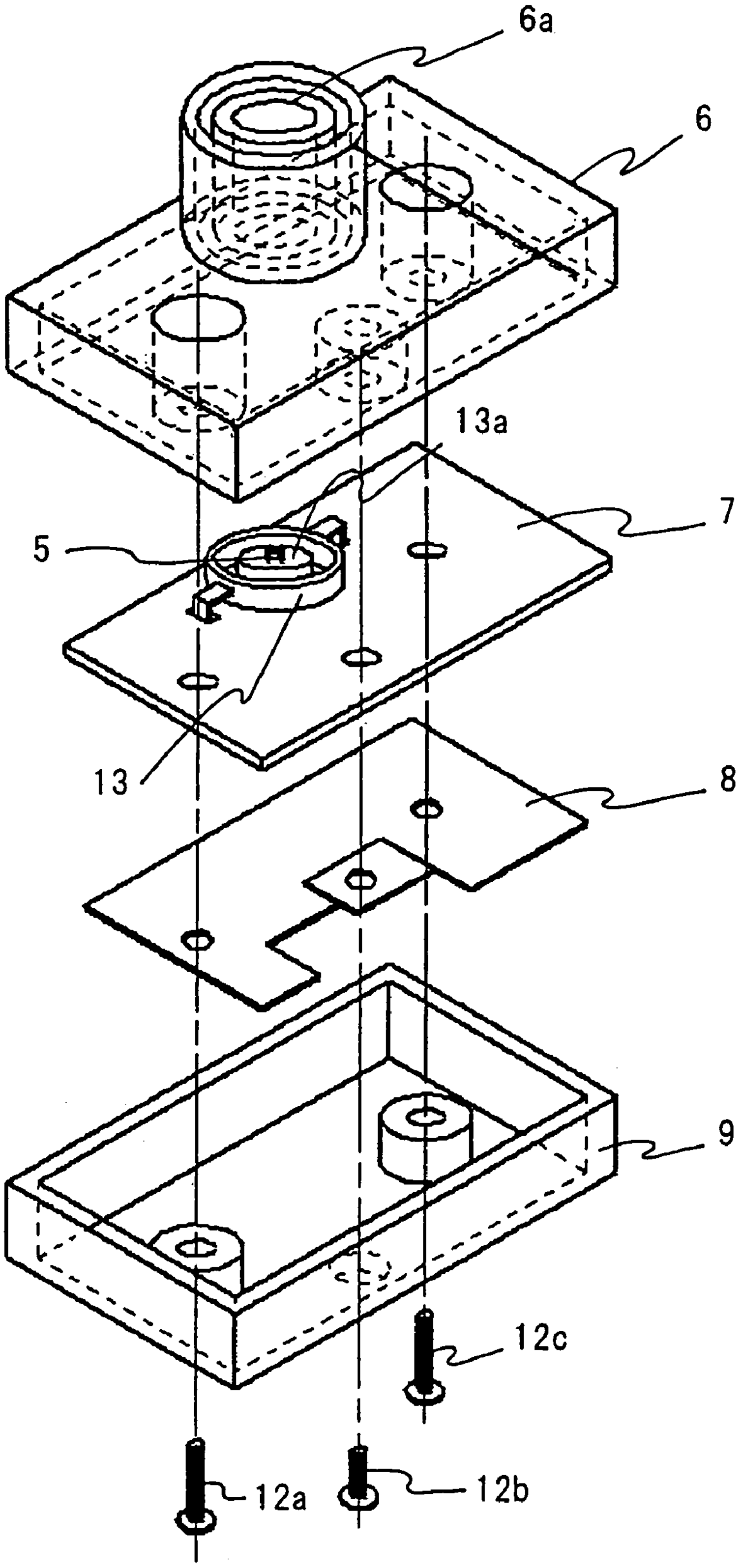
FIG. 4 is an exploded perspective view of the control unit of the embodiments 1 to 3 of the present invention.
Figure 5:
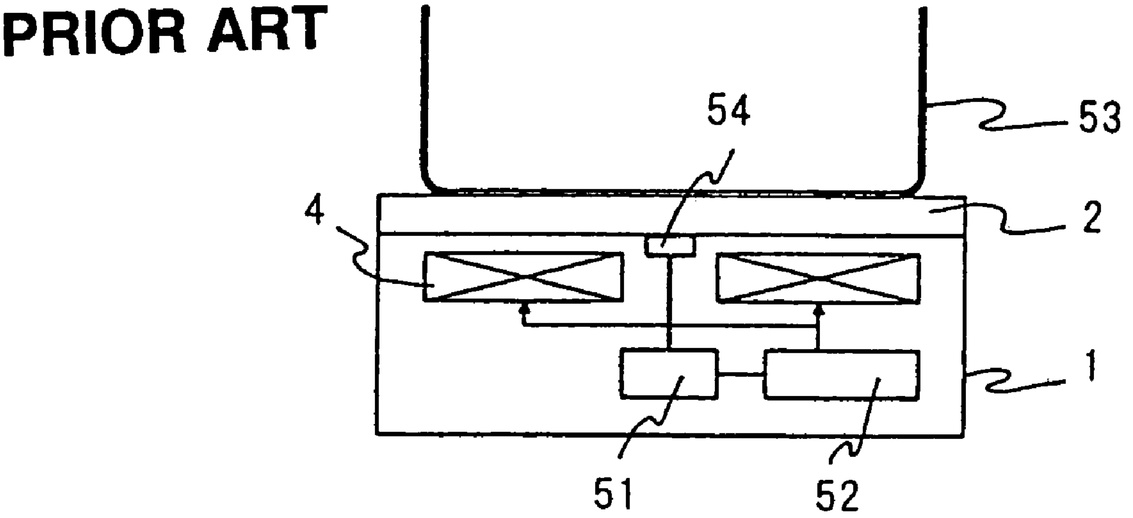
F I G. 5 PRIOR ART
FIG. 5 is a cross-sectional drawing showing the configuration of an induction heating apparatus of prior art using a thermo-sensitive element.
Figure 6:
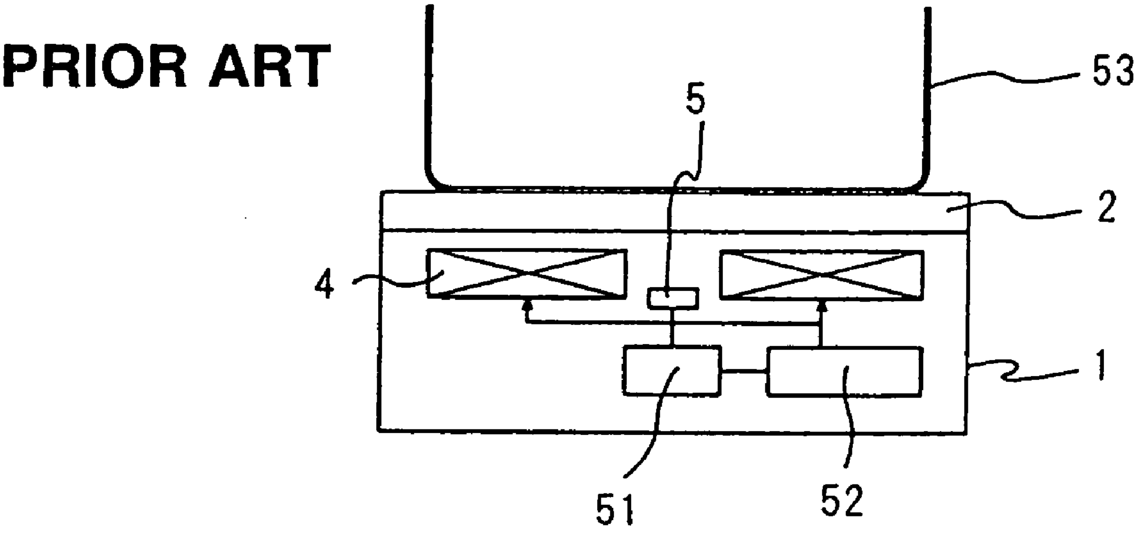
F I G. 6 PRIOR ART
FIG. 6 is a cross-sectional drawing showing the configuration of an induction heating apparatus using an infrared sensor.

The induction heating apparatus of the embodiment 1 of the present invention is described using FIG. 1, FIG. 4 and FIG. 6. FIG. 6 is a sectional view showing the outline configuration of the induction heating apparatus of the embodiment 1 of the present invention. FIG. 6 was described in the example of prior art. FIG. 1 is a sectional view of the principal part showing the configuration of the induction heating apparatus of the embodiment 1 of the present invention. FIG. 4 is an outline drawing of exploded perspective view of the control unit of the embodiment 1 of the present invention. In FIG. 1, FIG. 4, and FIG. 6, numeral 1 is a main frame composing an outer casing of the induction heating apparatus. The upper side plane of a main frame 1 is composed of a top plate 2. The top plate 2 has a loading part 3 on which a cooking container is placed. An induction heating coil (induction heating means) 4 is provided in the lower part of the loading part 3 of the top plate 2. The induction heating coil 4 induction-heats a cooking container 53 (cooking container to be heated, not shown in FIG. 1).

Numeral 5 is an infrared sensor. The infrared sensor 5 detects the infrared radiation radiated from the base plane of the cooking container through the top plate 2 and outputs a signal according to the temperature. The infrared sensor 5 is arranged at a position of 15 millimeters to 35 millimeters under the upper surface of the top plate 2. Desirably, it is 26 millimeters.

Numeral 6 is the magneto-shielding member that restrains the magnetic flux leakage from induction heating coil 4 that is occurring during the induction heating. In the embodiment 1, magneto-shielding member 6 is made of die-cast of aluminum, and inner surface of a cylindrical body **6*a* is finished by the mirror-surface finishing (mirror-finished) by roller burnishing. Thickness of the magneto-shielding member 6 is 1.5 millimeters to 5 millimeters. Desirably the thickness is 2 millimeters. The reflectivity of aluminum onto the infrared sensor 5 is high (infrared radiation radiated from the cooking container 53 is transferred to the infrared sensor 5 with low loss), and infrared radiation from the aluminum itself is little (SIN ratio (signal-to-noise ratio) of the infrared radiation radiated from the cooking container 53 is less apt to be degraded.). The magneto-shielding member 6 has the cylindrical body 6*a*. By making the structure to be that the cylindrical body 6*a* is made to be single unitary body with respect to the magneto-shielding member 6, the location accuracy between the infrared sensor 5 and the cylindrical body 6*a* rises. The cylindrical body 6*a* transfers the infrared radiation radiated from the cooking container 53 to the infrared sensor 5 with low loss and also prevents that the magnetic flux from induction heating coil 4 leaks to the infrared sensor 5. The magneto-shielding member 6 covers the infrared sensor 5 and a control board 7 so that it stabilizes the ambient temperature around the infrared sensor 5 and a control board 7**.

Numeral 7 is the control board. The control board 7 controls the output of the induction heating coil 4. Specifically, a temperature calculation means 51 and a control means 52 are provided on the control board 7. The temperature calculation means 51 calculates the temperature of the cooking container 53 based on the output signal of infrared sensor 5. The control means 52 controls the power supply to the induction heating coil 4 based on the information obtained from the temperature calculation means 51.

Numeral 8 is a shield plate. The shield plate 8 covers almost all the lower part of control board 7. The shield plate 8 shields the magnetic flux turning from the underside of the control board and prevents the influence thereof. The magneto-shielding member 6 and the shield plate 8 are grounded with screws **12*b***.

Numeral 9 is a first resin cover. The first resin cover 9 holds magneto-shielding member 6 and shield plate 8. The first resin cover 9 and the magneto-shielding member 6 are joined by screws **12*a*, 12*b*, and 12*c*, forming a nearly closed space in which the infrared sensor 5, the control board 7, and the shield plate 8 are stored (called as "control unit"). The induction heating apparatus has a fan (not shown) in the lower part of the main frame, and the fan suppresses the heating of the induction heating coil 4 by means of sending cooling wind to the induction heating coil 4. The nearly closed space composed of the first resin cover 9 and the magneto-shielding member 6 prevents a flow of cooling wind flowing through the neighborhood of the infrared sensor 5 from the lower part. Thereby the ambient temperature in the vicinity of the infrared sensor 5** is stabilized and hence a high accuracy detection of temperature is realized.

In place of the above, it is also possible that the base plane of the first resin cover 9 is opened toward the lower direction and the shield plate 8 blocks this base plane. In this case, the first resin cover 9, shield plate 8 and magneto-shielding member 6 compose a nearly closed space and the infrared sensor 5 and the control board 7 are stored in it.

A second resin cover 13 is provided on the control board 7 (circuit board). The second resin cover 13 holds the infrared sensor 5 in the position with a fixed height from the control board 7. The second resin cover 13 is arranged between the infrared sensor 5 and the control board 7, on which the infrared sensor is installed, and shields almost all of the control board 7 from the infrared radiation radiated from the cooking container 53. Terminals of the infrared sensor 5 are directly soldered to the control board 7. The second resin cover 13 has a holding plane 13*a* on which the infrared sensor 5 is placed, and the magneto-shielding member 6 has a recessed portion 6*b* which is opened toward the lower direction; and the holding plane 13*a* is positioned inside the recessed portion 6*b*, and the side planes and the base plane of a space defined by the second resin cover 13 and the recessed portion 6*b* are closed nearly completely. By this configuration, it is possible to prevent further that wind of the cooling fan or air flows around the infrared sensor. The ambient temperature of the infrared sensor 5 is kept constant further, thereby temperature of the cooking container 53 can be detected in high accuracy.

Numerals 10 and 11 are ferrites having the magneto-shielding effect. Ferrite 10 is arranged between the induction heating coil 4 and the infrared sensor 5 as well as on a circle having its center on a vertical axis running through the infrared sensor 5. Top surface of the ferrite 10 is set higher than the upper side surface of the induction heating coil 4; and the underside of ferrite 10 extends to the lower direction so that a line connecting the outermost periphery of the induction heating coil 4 and the infrared sensor 5 is blocked by the ferrite. The ferrites 11 are arranged in the radial direction.

With the above configuration, the infrared sensor 5 becomes less apt to be influenced by the induced magnetic field from the induction heating coil 4 that is occurring during the cooking by the induction heating. Since the heat generation of the infrared sensor 5 itself caused by the leakage magnetic flux is suppressed, correct temperature detection can be performed and thereby a stable heating control can be realized.

Embodiment 2

Figure 2:
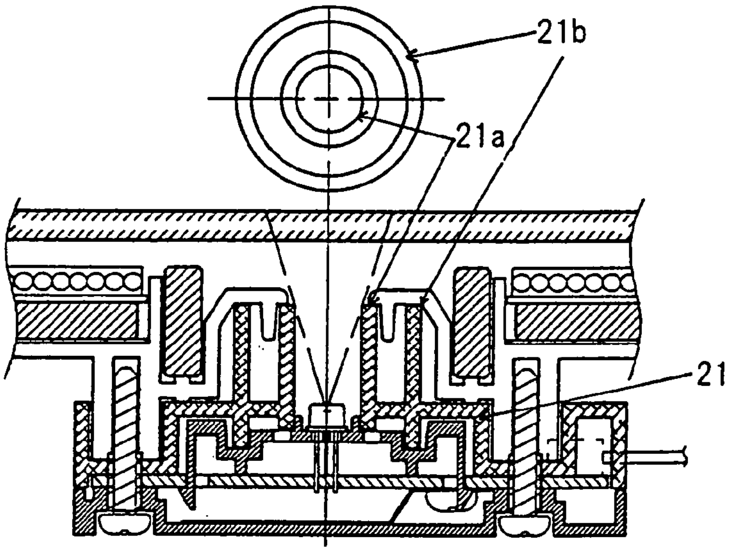
FIG. 2 is a cross-sectional drawing of principal part showing the configuration of the induction heating apparatus in an embodiment 2 of the present invention.
Figure 3:
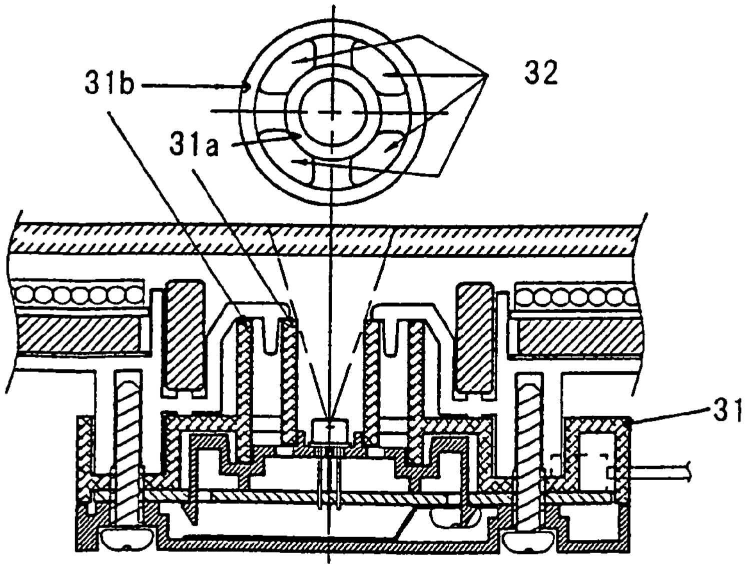
FIG. 3 is a cross-sectional drawing of principal part showing the configuration of the induction heating apparatus in an embodiment 3 of the present invention.

Using FIG. 3 and FIG. 6, the induction heating apparatus of an embodiment 2 of the present invention is described. FIG. 6 is a cross-sectional drawing showing the outline configuration of the embodiment 2 of the present invention. FIG. 2 is a cross-sectional drawing of main part showing the configuration in an embodiment 2 of the present invention. An induction heating apparatus of the embodiment 2 differs from the embodiment 1 in the cylindrical body of magneto-shielding member 21. Since the other configuration than that is identical with embodiment 1, identical numerals are used for the identical components and explanations thereof are omitted.

The magneto-shielding member 21 of the embodiment 2 is described. The magneto-shielding member 21 has double cylindrical bodies 21*a* and 21*b*, which are approximately coaxial to each other. By making the cylindrical body to be a double configuration, the magneto-shielding effect with respect to the infrared sensor 5 is raised, and moreover, by an increase of thermal capacity owing to the double configuration, the ambient temperature in the vicinity of the infrared sensor 5 as well as the control board 7 can be maintained further stably. The induction heating apparatus of the embodiment 2 can detect the temperature in further higher accuracy.

By making the structure to be that the cylindrical bodies 21*a* and 21*b* are made as a single unitary body, a uniform space (having an insulation effect) can be secured between the cylindrical bodies 21*a* and 21*b*, thereby the ambient temperature in the vicinity of the infrared sensor 5 can be stabilized remarkably. Moreover, owing to an increase in accuracy of the position of the infrared sensor 5 and the magneto-shielding member 21, the temperature detection can be performed more accurately, thereby a stable heating control can be achieved.

Embodiment 3

Using FIG. 3 and FIG. 6, the induction heating apparatus of an embodiment 3 of the present invention is described. FIG. 6 is a cross-sectional drawing showing the outline configuration of a position of the embodiment 3 of the present invention. FIG. 3 is a cross-sectional drawing of principal part showing the configuration in an embodiment 3 of the present invention. An induction heating apparatus of the embodiment 3 differs from the embodiment 2 in that the magneto-shielding member 31 has openings 32. Since the other configuration than that is identical with embodiment 2, identical numerals are used for the identical components and explanations thereof are omitted.

The magneto-shielding member 31 of the embodiment 3 is described. The magneto-shielding member 31 has the openings 32 between the double cylindrical bodies 31*a* and 31*b* that are almost coaxial to each other. In the embodiment 3, number of openings is four. Even when the cylindrical body 31*b* generates heat, by cutting the heat by the openings 32, the thermal conduction to the cylindrical body 31*a* can be reduced further. Therefore, the ambient temperature in the vicinity of the infrared sensor 5 can be stabilized.

According to the present invention, the influence of the leakage magnetic flux from the induction heating means is avoided by covering the periphery of the infrared sensor and at least a part of the control board with the magneto-shielding member; therefore, the induction heating apparatus in which the infrared sensor performs stable temperature detection can be realized.

In the present invention, by making the cylindrical body and the side part of the magneto-shielding member to be a single unitary body, a good assembling workability is realized. According to the present invention, an induction heating apparatus having a high dimensional accuracy, a fewer numbers of parts, and also having an excellent assembling workability can be realized.

In the present invention, the cylindrical body is formed in a nearly coaxial structure of double configuration; with this structure, the magneto-shielding effect to prevent the leakage of magnetic flux onto the infrared sensor 5 is raised further, and moreover, by an increase of the thermal capacity owing to the placement of the magneto-shielding member, the ambient temperature in the vicinity of the infrared sensor 5 can be maintained further stably. According to the present invention, an advantageous effect that an induction heating apparatus in which the temperature detection is performed in a further higher accuracy can be realized.

By making the configuration in a manner that the openings are provided at the joint part of outside and inside of the double cylindrical body, the following effects develop: Even if the outside of the cylindrical body is heated, the thermal resistance up to the center at which the infrared sensor is placed becomes larger; therefore, the rapid change of the ambient temperature in the vicinity of the infrared sensor can be avoided. Moreover, according to the present invention, an advantageous effect that an induction heating apparatus in which the further stable temperature detection is performed can be realized.

Although the present invention has been described with respect to its preferred embodiments in some detail, the disclosed contents of the preferred embodiments may change in the details of the structure thereof, and any changes in the combination and sequence of the components may be attained without departing from the spirit and scope of the claimed invention.

INDUSTRIAL APPLICABILITY

The present invention is useful for the induction heating apparatus equipped with the infrared sensor or the like.

The invention claimed is:

1. An induction heating apparatus characterized in that it has;

a main frame composing an outer casing, a top plate provided on the upper side surface of said main frame and having at least one loading part on which a cooking container to be heated is placed, an induction heating means which is provided in the lower part of said loading part and is to heat said cooking container to be heated, an infrared sensor which is provided in the neighborhood of said induction-heating means and receives the infrared radiation radiated from said cooking container to be heated, and outputs the detected signal corresponding to the amount of the infrared radiation, a control board that detects the temperature of said cooking container to be heated based on said detected signal, and controls the output of said induction heating means, a magneto-shielding member configured in a single unitary body including a cylindrical part which covers the periphery of said infrared sensor and a side part which covers at least a part of said control board.

2. An induction heating apparatus of claim 1 characterized in that said cylindrical body is formed in a nearly coaxial structure of double configuration.

3. An induction heating apparatus of claim 2 characterized in that it has openings at a joint part of said cylindrical body positioned inside and said cylindrical body positioned outside.

4. An induction heating apparatus of claim 1 characterized in that the material of said magneto-shielding member is aluminum.

5. An induction heating apparatus of claim 1 characterized in that said magneto-shielding member is made of die-cast, and its inner surface is formed by the mirror-surface finishing.

6. An induction heating apparatus of claim 5 characterized in that the inner surface of said cylindrical body is finished as the mirror-surface by the roller burnishing.

7. An induction heating apparatus of claim 1 characterized in that the distance between the upper side surface of said top plate and the upper side surface of said infrared sensor is in a range of 15 mm to 35 mm.

8. An induction heating apparatus of claim 1 characterized in that the thickness of said magneto-shielding member is in a range of 1.5 mm to 5 mm.

9. An induction heating apparatus of claim 1 characterized in that it further has a shield plate that covers nearly whole lower part of said control board.

10. An induction heating apparatus of claim 9 characterized in that said magneto-shielding member and said shield plate are grounded.

11. An induction heating apparatus of claim 9 characterized in that it further has a first resin cover which holds said magneto-shielding member and said shield plate, and said first resin cover, said magneto-shielding member and said shield plate compose a nearly closed space in which said infrared sensor and said control board are stored.

12. An induction heating apparatus of claim 11 characterized in that it further has a second resin cover having a holding plane on which said infrared sensor is placed, and said magneto-shielding member having a recessed portion which is opened toward the lower direction, said holding plane is positioned in said recessed portion, and the side planes and the base plane of a space defined by said second resin cover and said recessed portion is nearly closed.

13. An induction heating apparatus of claim 1 characterized in that said magneto-shielding member is grounded.

14. An induction heating apparatus of claim 1 characterized in that it further has a first resin cover which holds said magneto-shielding member, and said first resin cover and said magneto-shielding member compose a nearly closed space in which said infrared sensor and said control board are stored.

15. An induction heating apparatus of claim 14 characterized in that it further has a second resin cover having a holding plane on which said infrared sensor is placed, and said magneto-shielding member has a recessed portion which is opened toward the lower direction, said holding plane is positioned in said recessed portion, and the side planes and the base plane of a space defined by said second resin cover and said recessed portion is nearly closed.

16. An induction heating apparatus of claim 1 characterized in that it further has a second resin cover which is placed between said infrared sensor and the circuit board on which the infrared sensor is installed, and which shields almost whole part of the circuit board from the infrared radiation radiated from said cooking container to be heated.

17. An induction heating apparatus of claim 16 characterized in that said second resin cover holds said infrared sensor at a position of a specified height from said circuit board.

18. An induction heating apparatus of claim 1 characterized in that said infrared sensor is placed at the central part of said induction heating means which is arranged spirally, and ferrites are provided between said induction heating means and said infrared sensor.

* * * * *

UNITED STATES PATENT AND TRADEMARK OFFICE

CERTIFICATE OF CORRECTION

PATENT NO. : 7,049,564 B2
APPLICATION NO. : 10/524372
DATED : May 23, 2006
INVENTOR(S) : Kiyoyoshi Takada et al.

It is certified that error appears in the above-identified patent and that said Letters Patent is hereby corrected as shown below:

Title Page, Item (54):

The title should read: -- INDUCTION COOKING APPARATUS WITH INFRARED SENSOR --.

Signed and Sealed this

Twenty-sixth Day of December, 2006

JON W. DUDAS
*Director of the United States Patent and Trademark Office*